United States Patent [19]

Dawson

[11] 4,099,904
[45] Jul. 11, 1978

[54] NOZZLE SHUT-OFF VALVE FOR INJECTION MOLDING MACHINE

[75] Inventor: James Earl Dawson, Lebanon, Ohio

[73] Assignee: Cincinnati Milacron Inc., Cincinnati, Ohio

[21] Appl. No.: 789,533

[22] Filed: Apr. 21, 1977

[51] Int. Cl.$^2$ .............................................. B29F 1/03
[52] U.S. Cl. .................................... 425/563; 251/31; 251/63.4; 425/562; 425/564
[58] Field of Search ............... 425/562, 563, 564, 568; 251/31, 63.4; 137/484.2

[56] References Cited

U.S. PATENT DOCUMENTS

| | | | |
|---|---|---|---|
| 2,936,996 | 5/1960 | Mercer | 251/31 |
| 3,500,501 | 3/1970 | Johansson | 425/564 X |
| 3,690,797 | 9/1972 | Garner | 425/563 X |
| 3,819,313 | 6/1974 | Josephsen et al. | 425/564 X |
| 4,013,391 | 3/1977 | Boden et al. | 425/562 X |

FOREIGN PATENT DOCUMENTS 18,521   9/1963   Japan .................... 425/564

Primary Examiner—Francis S. Husar
Assistant Examiner—William R. Briggs
Attorney, Agent, or Firm—Daniel P. Worth

[57] ABSTRACT

A nozzle shut-off valve for placing between the injection apparatus and the mold cavity uses two pins of different lengths for the valve elements and switches air pressure back and forth between pistons on opposite (outer) ends of the pins. The pistons have no fixed connection to the pins. Each pin is actuated either by force from the piston on its outer end or pressure by the plastic melt on its innermost other end. The longer pin has a length sufficient to extend completely across the injection passage and block it to prevent any flow. The shorter pin is deliberately made short enough that it cannot block the passage. The valve is actuated by air pressure on the two pistons in timed relation to injection molding events. Pressure on the piston engaging the longer pin compels blocking of the injection passage during plastication. Switching of pressure to the other pin during injection permits the pressure of molten plastic to spread the pins apart whereupon injection proceeds in the ususal manner.

2 Claims, 4 Drawing Figures

AIR PRESSURE

← AIR PRESSURE

NOZZLE SHUT-OFF VALVE FOR INJECTION MOLDING MACHINE

SUMMARY AND BACKGROUND OF INVENTION

The present relates to an improved nozzle shut-off valve for an injection molding machine. One aspect of the invention also relates to a complete injection molding machine having an improved nozzle shut-off valve. An aspect of the invention is a nozzle shut-off valve having fluid pressure operated pistons at lower ends of the valve elements which are a long pin and short pin cooperatively arranged to block and unblock the plastic injection passageway.

U.S. Pat. No. 3,500,501 issued on Mar. 17, 1970 is the prior art over which the present invention is an improvement. Said U.S. Patent provides a nozzle shut-off device interposed between a nozzle having a plasticizing chamber, the device having therethrough a passageway for molten material and a spool reciprocable to intersect said passageway. The spool also has a passageway and it is capable of communicating with the melt passageway. Ordinarily, the spool travels perpendicular to the melt passageway. Pistons on the ends of the spool are caused to push the spool back and forth as needed by connecting same to a source of fluid pressure. In one position the spool blocks the first passageway and the other position aligns the spool and melt passageways to allow molten plastic material to enter the nozzle.

The present invention affords a different structure which provides manufacturing as well as operational improvements. The desired mode of operation of course is to block and unblock the passageway leading into the nozzle thereby to shut-off or permit flow of molten material. Most succinctly, the structural difference of the present invention employs a long pin and a short pin, both arranged to slide in a passageway that intersects the melt passageway. The pins can be driven towards the melt passageway but are not physically connected to the pistons at their ends. This facilitates assembly by eliminating alignment problems and also improves operation inasmuch as operating conditions such as high temperature and the various axial and pressure forces on the nozzle may create occasional problems.

Thus, in a preferred embodiment, the present invention relates to a nozzle shut-of device for use in an injection molding machine by being interposed between the nozzle and plasticator melt chamber thereof, which device comprises a body having therethrough a first passageway for alignment and communication with said chamber and a passageway formed in said nozzle, and second and third passageways in said body substantially coaxial with each other and on opposite sides of and intersecting said first passageway at a substantially common location; first and second cylinders mounted on said body respectively at that end of said third and second passageways remote from said first passageway; first and second pistons respectively mounted on said first and second cylinders; a long pin reciprocably mounted in said second passageway, of a cross section sufficient to substantially block said second passageway and having a length sufficient to extend from said second piston along said second passageway completely across said first passageway and to enter said third passageway; and a short pin reciprocably mounted in said third passageway, of a cross section sufficient to substantially block said third passageway and having a length sufficient to extend along said third passageway from said first piston but to protrude not more than partly across the first passageway.

Other objects, advantages, and features will be appreciated from a reading of the following specification and the annexed drawings wherein.

Figure 1:
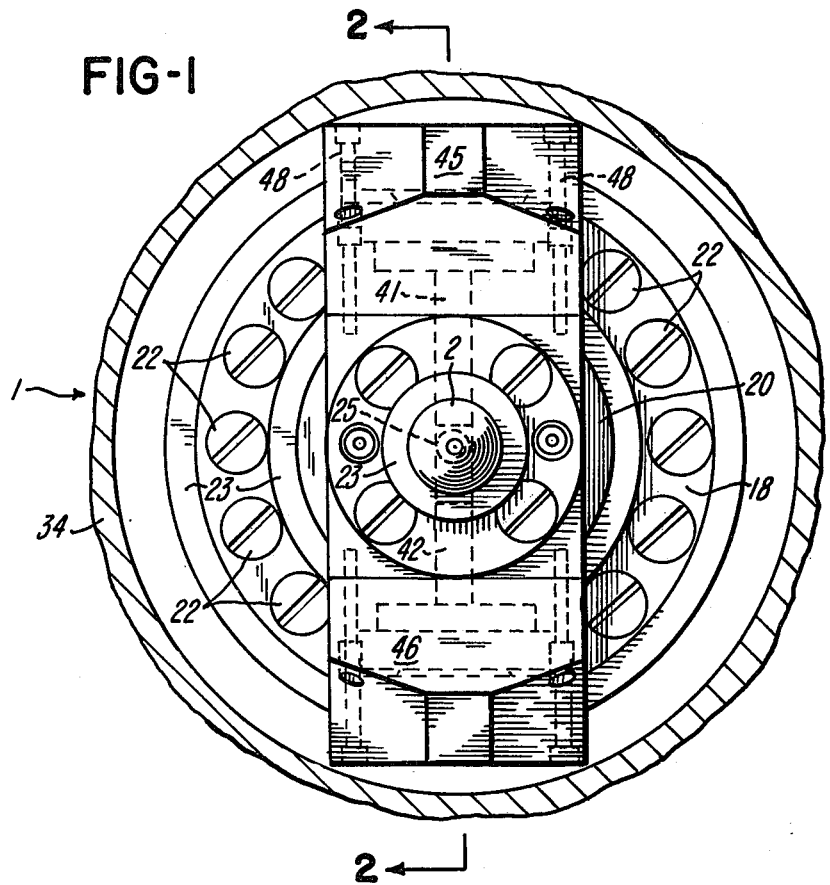
FIG. 1 is an end view of the nozzle shut-off device interposed between the nozzle and plasticizing cylinder.
Figure 3:
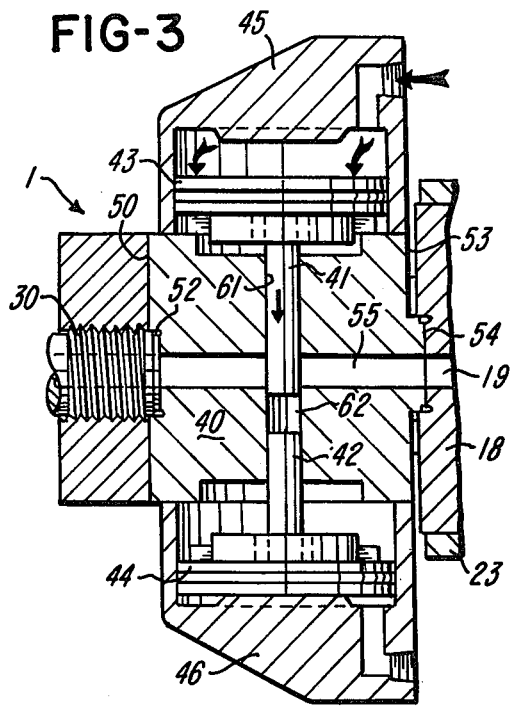
FIG. 3 is a partial sectional view of FIG. 1 along section 2—2 showing the valve elements in the shut-off position where the melt passage is blocked.
Figure 4:
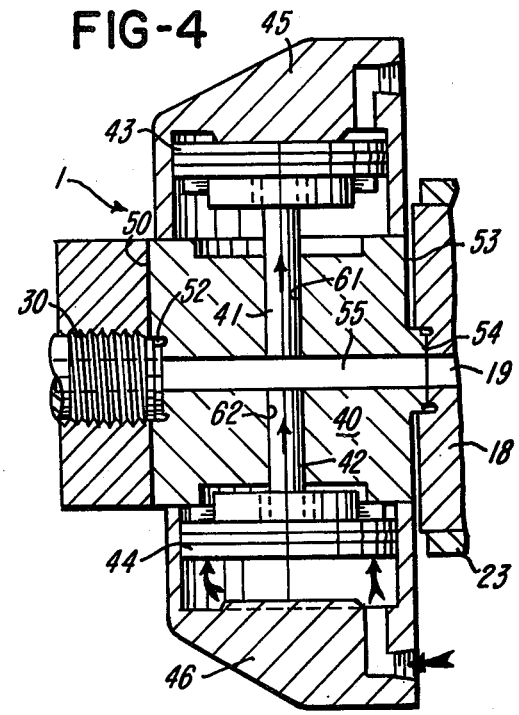
FIG. 4 is a partial sectional side view along 2—2 of FIG. 1 showing the valve according to the invention in the open position wherein plastic flows from a plasticizing chamber to the nozzle.

Tailed arrows are used in FIGS. 3,4 to show gas (e.g. compressed air) flow; arrows with no tails show motion therein.

The drawings show a nozzle shut-off valve 1 interposed between nozzle 2 and plasticizing cylinder 10 of an injection moldng machine having for example a cylinder composed of barrel 11, liner 12, and a reciprocable and rotatable plasticizing screw 14 having a screw tip 16 and back flow assembly valve of the ring type 17 interposed therein. A cylinder end cap 18 has a central axial passageway 19, flat front face 20 and front face cylindrical recess 21 and is mounted to one end of the cylinder 10 by a series of equally spaced bolts 22 in a fashion well-known in the prior art. Heating elements such as shown at 23 may be circumferentially located around the end cap, nozzle, and all other part of the barrel.

The nozzle 2 is of traditional and well-known structure having a central axial passageway 25, hemispherical front end surface 26 which matingly engages a corresponding female part 27 in the mole 28 when the unit is operating to injection mold, a threaded portion 30 and concentric cylindrical rear end aligning means 31. The female hemispherical recess 27 in the mold has a passageway 33 therethrough leading into the mold cavity and thus communication can be established from the plasticizing chamber through the melt passageway 19, the valve 1 herein, the nozzle 2 and its passage 25, and finally the mold 28 which is attached to the platen 34.

What has been described so far is well-known prior art. Further explanation of the prior art construction is not deemed desirable and the reader is referred to, inter alia, said U.S. Letters Patent for further details of the environment in which the present invention is employed.

Figure 2:
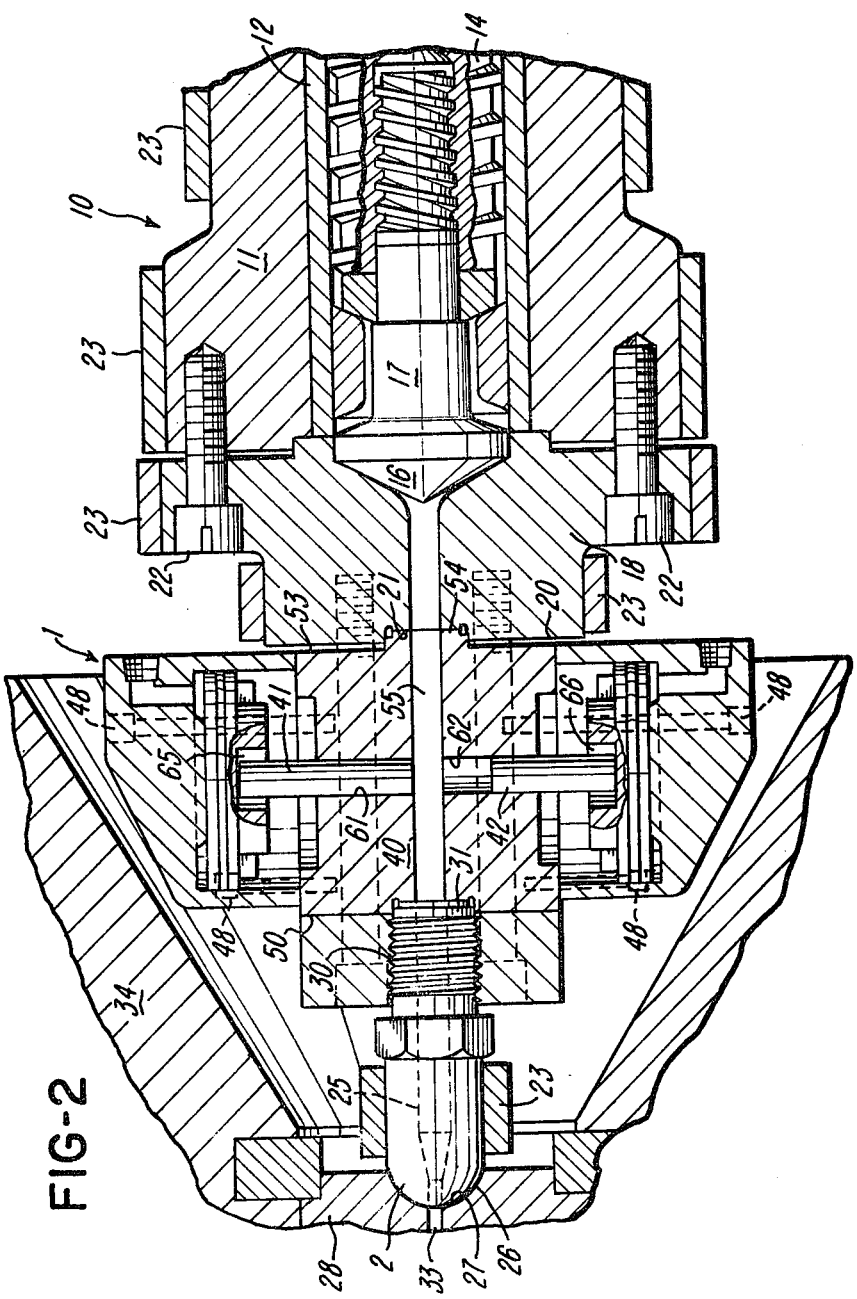
FIG. 2 is a sectional view along section 2—2 of FIG. 1 showing the nozzle shut-off device of the present invention interposed between the nozzle and plasticizing cylinder.

Referring now particularly to FIGS. 2, 3 and 4, we find the nozzle shut-off device 1 of the present invention having a valve body 40, a pair of valve elements 41,42 comprising a long pin and a short pin (meaning a pin that is shorter than the long pin), pistons 43,44 and cylinders 45,46 in which the pistons ride which are mounted on the valve body by volts 48. The valve body 40 is preferably generally rectangular in shape and has a flat front face 50 with a central cylindrical recess 52 parallel with and in register with the flat rear face 53 and alignment boss 54 extending therefrom. These permit accurate alignment of the melt or first passageway 55 that extends through the valve body along the axis of the molten plastic flow so that it is substantially coaxial with the passages 19,25 in the barrel and nozzle.

There are second and third passageways 61,62 in which reciprocate long and short pins 41,42, respectively. The second and third passageways are substantially coaxial and have a common intersection with the first or molten plastic passage. Preferably, the angle of intersection is approximately 90° or perpendicular.

The length of the long pin 41 is sufficient to extend along the second passageway 61, completely across the first or melt passageway 55 and to enter the third passageway much in the fashion shown in FIG. 3. The purpose of this, of course, is to permit the long pin to block flow through the passageway 55 and thereby achieve the nozzle shut-off function.

The short pin 42 which is mounted to reciprocate in the third passageway 62 has a length sufficient to extend along the third passageway and to protrude at most partly across the molten plastic passageway. Pin 42 is short enough that it cannot completely block melt passage 52 when in the open position, e.g. FIG. 4.

The reason for the difference in length is to permit the long pin to shut-off flow as in FIG. 3 and yet to permit the two pins to be spread apart and pushed back into their respective passageways thereby to permit flow of molten plastic as shown by the position of the elements in FIG. 4. The ends of the two pins may be slightly chamfered.

The underside of each piston has a recess 65,66 respectively to receive, roughly align, and keep alignment of the pins.

First and second cylinders 45,46 are mounted on opposite ends of the body to provide pneumatic chambers in which are reciprocably mounted the first and second pistons 43,45 for respectively driving the long and short pins. There is no mechanical connection between the pistons and the pin. This is a floating connection, in other words, and permits assembly and operation of the unit without worrying about the alignment of the center lines of the pistons cylinders, passageways and pins. Of course, the pistons when pushed by compressed gas (air) toward the melt passage 55 will drive their respective pins in that direction and accordingly appropriate pneumatic control means are provided to direct air or other compressed gas on top of the first piston 43 to shut-of plastic flow per FIG. 3 and conversely to turn off such first piston air and turn on second piston 44 air thereby to push short pins toward the melt passage thereby allowing melt flow as in FIG. 4. Due to the way injection molding machines work, when the short pin pushes the long pin up into the melt passage, the pressure of molten plastic from the injection unit is great enough to force its way between the interface between the two pistons and complete opening the shut-off valve as shown in FIG. 4.

In other words, this shut-off valve uses the pressure of the molten plastic being injected as a means to open shut-off valve. Only when this pressure has dropped off can the shut-off valve be closed: and this recognizes that injection pressure does fall off substantially at the end of the injection stroke and that closure of the valve is relatively easy then.

The fluid pressure supply and mode and manner of providing it are described in said U.S. Patent and also well-known to the prior art. Compressed gas, ordinarily compressed air, is preferred for this operation because the high temperatures would tend to coke or carbonize hydrocarbon based oil or have similar detrimental effects on other types of hydraulic liquid. Means well-known in the art (e.g. injection screw position responsive electrical switches) connect a source of fluid pressure (compressed air) alternatively to said cylinders to pressurize one and vent the other of said cylinders, thus causing said pins to reciprocate, thereby in one position blocking the first passageway in said body with said long pin and in the other position opening the first passageway in said body by positioning said long pin out of said passageway thus allowing molten material to pass from said chamber into said nozzle. Thus, each of said pistons drives its corresponding pin toward said first passageway in response to fluid pressure being applied against that face of the piston most remote from said pin.

Normally a small disc of molten plastic is trapped between the long and short pins 41,42 thus causing the pin spacing of FIG. 3 (i.e. when the valve is closed) where the disc is not shown in the interest of drawing clarity. The disc is kept molten by heat from the surroundings such as heater bands 23.

I claim:

1. In an injection molding apparatus comprising a chamber having a nozzle attached near one end thereof, means for forcing molten material from said chamber through a passageway formed in said nozzle, a mold having a sprue formed therein, which sprue is in communication with the passageway formed in said nozzle, and a nozzle shut-off device interposed between said nozzle and said chamber the improvement comprising:

(a) a body for said device having a first passageway in communication with both said chamber and the passageway formed in said nozzle and a second passageway intersecting said first passageway, and a third passageway substantially coaxial with said second passageway and having common intersection with said first and second passageway;

(b) a long pin reciprocal in said second passageway and having a length sufficient to extend at least along said second passageway, completely across said first passageway and to enter said third passageway;

(c) a short pin reciprocal in said third passageway but having a length less than said long pin length yet sufficient to extend completely along said third passageway and to protrude not more than partly across said first passageway and being substantially coaxial with said long pin;

(d) first and second pistons respectively engaging that end of said long pin and said short pin most remote from said first passageway;

(e) first and second cylinders encompassing said first and second pistons, respectively, each being mounted on said body and having means for connecting same to a fluid pressure source; and (f) means in each of said cylinders to establish communication from one side of its said piston to a source of fluid pressure.

2. A nozzle shut-off device for use in an injection molding machine by being interposed between the nozzle and plasticator melt chamber thereof, which device comprises:

(a) a body having therethrough a first passageway for alignment and communication with said chamber and a passageway formed in said nozzle, and second and third passageways in said body substantially coaxial with each other and on opposite sides of and intersecting said first passageway at a substantially common location;
(b) first and second cylinders mounted on said body respectively at that end of said third and second passageways remote from said first passageway;
(c) first and second pistons slidably mounted, respectively, in said first and second cylinders;
(d) a long pin reciprocably mounted in said second passageway, of a cross section sufficient to substantially block said second passageway and having a length sufficient to extend from said second piston along said second passageway completely across said first passageway and to enter said third passageway;
(e) a short pin reciprocably mounted in said third passageway, of a cross section sufficient to substantially block said third passageway and of a length less than said long pin length and sufficient to extend along said third passageway from said first piston but to protrude not more than partly across the first passageway; and
(f) means in each of said cylinders to establish communication from one side of its said piston to a source of fluid pressure.

* * * * *